(12) United States Patent
Yasukawa et al.

(10) Patent No.: US 7,885,160 B2
(45) Date of Patent: Feb. 8, 2011

(54) METHOD OF RECORDING INFORMATION ON AND REPRODUCING INFORMATION FROM OPTICAL DISK AND APPARATUS FOR THE SAME

(75) Inventors: Takakiyo Yasukawa, Fujisawa (JP); Koichi Watanabe, Hachioji (JP); Naohito Ikeda, Yokohama (JP); Toshio Shoji, Urayasu (JP); Yasuhiro Wada, Kawaguchi (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 377 days.

(21) Appl. No.: 12/178,828

(22) Filed: Jul. 24, 2008

(65) Prior Publication Data
US 2009/0080301 A1    Mar. 26, 2009

(30) Foreign Application Priority Data
Jul. 24, 2007    (JP) ............................. 2007-192564

(51) Int. Cl.
*G11B 7/00*    (2006.01)

(52) U.S. Cl. .............. 369/59.12; 369/59.17; 369/59.19; 369/59.2; 369/47.53; 369/47.28

(58) Field of Classification Search ....................... None
See application file for complete search history.

(56) References Cited

U.S. PATENT DOCUMENTS

| 7,397,751 B2 * | 7/2008 | Kaneshige et al. | ....... 369/59.24 |
| 2007/0127343 A1 * | 6/2007 | Tseng et al. | ............. 369/59.12 |

FOREIGN PATENT DOCUMENTS

| JP | 2002-170237 A | 6/2002 |
| JP | 2006-012226 A | 1/2006 |
| JP | 2007-018582 A | 1/2007 |

* cited by examiner

*Primary Examiner*—Muhammad N Edun
(74) *Attorney, Agent, or Firm*—Townsend and Townsend and Crew LLP

(57) ABSTRACT

There is provided an information recording and reproducing method and an apparatus for the same capable of optimizing the shift adjustment of a recording pulse recorded in an optical disk even at the time of recording information on the optical disk at a high speed. The shift adjustment value of the recording pulse optimized at a low speed recording on an optical disk is multiplied by a constant value to be taken as the optimum shift conditions of the recording pulse at the high speed recording.

11 Claims, 11 Drawing Sheets

METHOD OF RECORDING INFORMATION ON AND REPRODUCING INFORMATION FROM OPTICAL DISK AND APPARATUS FOR THE SAME

CROSS-REFERENCES TO RELATED APPLICATIONS

This application relates to and claims priority from Japanese Patent Application No. 2007-192564, filed on Jul. 24, 2007, the entire disclosure of which is incorporated herein by reference.

BACKGROUND

1. Field of the Invention

The present invention relates to an information recording and reproducing method for recording information on an information recording medium using a semiconductor laser and an information reproducing apparatus for executing the method.

2. Description of Related Art

The kind of an optical disk is versatile as an information recording medium capable of recording information using light. For example, as an optical disk capable of writing information only once, there have been known CD-R, DVD-R, R+ and BD (Blu-ray Disc)-R. In addition, as an optical disk capable of writing information multiple times, erasing and rewriting written information, there have also been known CD-RW, DVD-RAM, DVD-RW, +RW and BD-RE.

Each optical disk being a recording medium disperses in thickness of a cover layer, thickness of a recording film and sensitivity. If conditions for recording data are fixed, an optimum reproduced signal cannot be obtained due to manufacturing tolerances of the optical disk. Similarly, in the recording and reproducing apparatus, influence cannot be ignored that aberration is generated in an optical pickup system by manufacturing tolerances of various components and adjusting tolerances of components such as deviation in focus target value.

An optical disk recording and reproducing apparatus optimizes recording conditions for providing an optical disk with a recording power and a recording pulse at the time of recording information in the optical disk in consideration of such tolerances to stably record and reproduce information (refer to, for example, Japanese Patent Laid-Open No. 2006-12226).

An information recording and reproducing apparatus has determined conditions for recording information on an optical disk to optimize a reproduced signal in such a manner that a recording mark is written on trial in a predetermined area of the optical disk and data is reproduced from the recording mark written on trial.

As one of indexes for evaluating whether a reproduced signal is optimal, there is available a parameter which a reproduced signal has with respect to a time base. As this parameter, there is a jitter as displacement which the reproduced signal has with respect to a reference clock. The information recording and reproducing apparatus forms the recording mark to minimize the jitter.

[Patent Document 1] Japanese Patent Laid-Open No 2006-12226

When data is recorded at a high speed on the optical disk, the information recording and reproducing apparatus cannot detect an evaluation parameter from the reproduced signal on the time base, which makes it difficult to optimize the recording signal. Particularly in the sextuple-speed (6x) recording on BD, the transmission band is as broad as 100 MHz, which makes it more difficult that the information recording and reproducing apparatus detects the evaluation parameter. As a result, a problem is raised in that the shift adjustment of the recording pulse cannot stably be performed at the time of recording information on the optical disk at a high speed.

SUMMARY

The present invention has its object to provide an information recording and reproducing method and an apparatus for executing the method capable of optimizing the shift adjustment of a recording pulse recorded in an optical disk even at the time of recording information on the optical disk at a high speed.

The present inventors devoted themselves to the investigation and found that only multiplying the shift adjustment value of the recording pulse optimized at the time of recording data on an optical disk at a first speed by a constant value is enabled to be used as the optimum shift condition in the data recording at a second speed which is faster than the first speed.

The present invention has been made based in this finding, and a method of recording information on and reproducing the same from an optical disk and an information recording and reproducing apparatus for executing the same, the method includes: a first step of writing data on trial in a first area of an optical disk at a first speed; a second step of reproducing the data written on trial on the optical disk; a third step of binarizing a reproduced signal obtained from the optical disk; a fourth step of synchronizing the binarized signal with a reference clock to obtain a reproduced synchronization signal; a fifth step of measuring a phase difference between the reproduced synchronization signal and the reference clock; a sixth step of optimizing the shift adjustment of a recording pulse applied to the first area on the basis of the phase difference; a seventh step of determining the shift conditions of the recording pulse for recording data in a second area of the optical disk at a second speed different from the first speed on the basis of the optimized shift adjustment value; and an eighth step of applying the recording pulse to the second area of the optical disk on the basis of the shift conditions obtained at the seventh step.

The present invention provides an information recording and reproducing method and an apparatus for executing the method capable of optimizing the shift adjustment of a recording pulse recorded in an optical disk even at the time of recording information on the optical disk at a high speed.

Other aspects and advantages of the invention will be apparent from the following description and the appended claims.

DETAILED DESCRIPTION OF PREFERRED EMBODIMENTS

Figure 1:
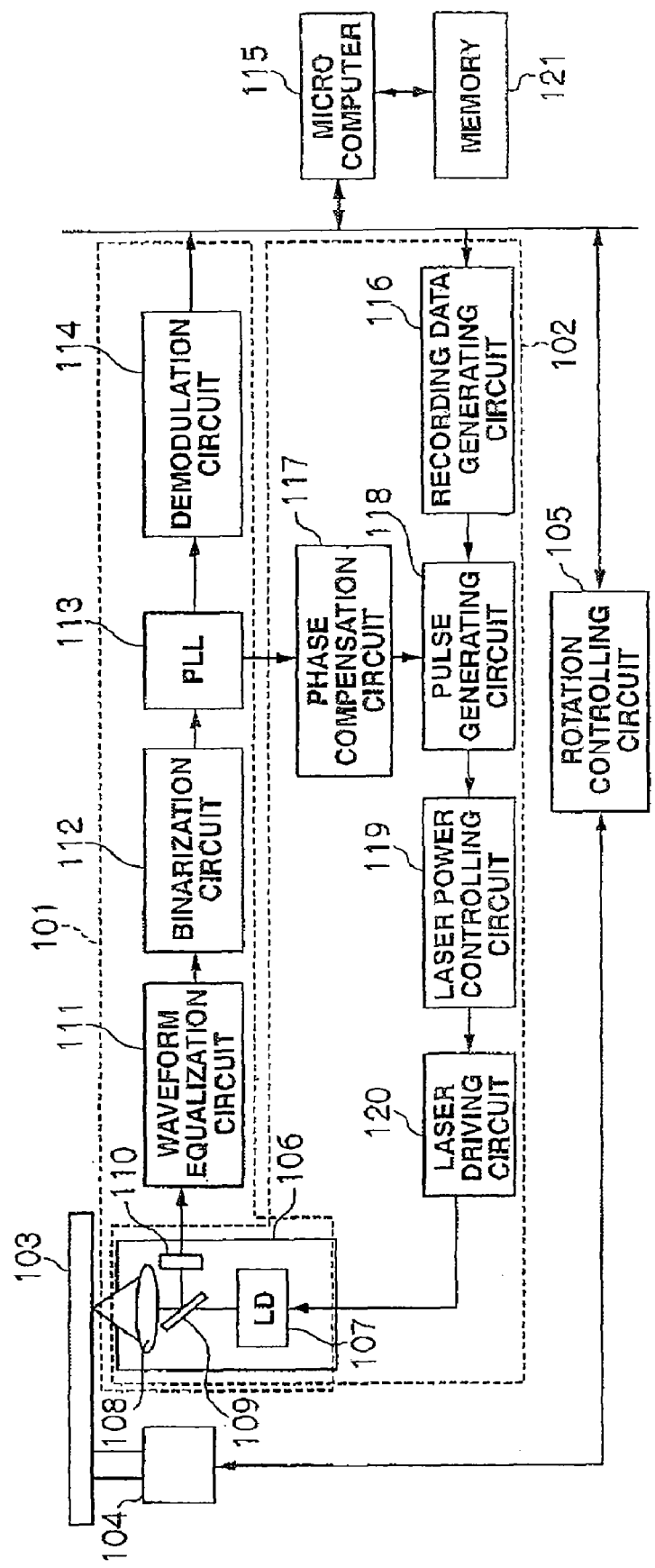
FIG. 1 is a block diagram of an apparatus for recording information on and reproducing information from an optical disk.

The embodiment of the present invention is described below FIG. 1 is a hardware block diagram of an information recording and reproducing apparatus. The information recording and reproducing apparatus mainly includes a reproduction signal processing unit 101 and a recording signal processing unit 102.

An information recording medium 103 is fixed to a spindle motor 104. A rotation controlling circuit 105 for the spindle motor 104 adjusts the spindle motor 104 to maintain a desired rotation speed according to locations on the information recording medium accessed by the reproduction signal processing unit 101 or the recording signal processing unit 102.

The technical development of an optical disk recording and reproducing apparatus has shortened the wavelength of a semiconductor laser and improved the characteristics of a recording film of an optical disk being an information recording medium, thereby enabling data of 25 GB to be recorded per one layer of recording film of the disk in a BD system using a blue laser. The system using the BD employs a modulation system with 2T as a shortest mark.

Figure 2:
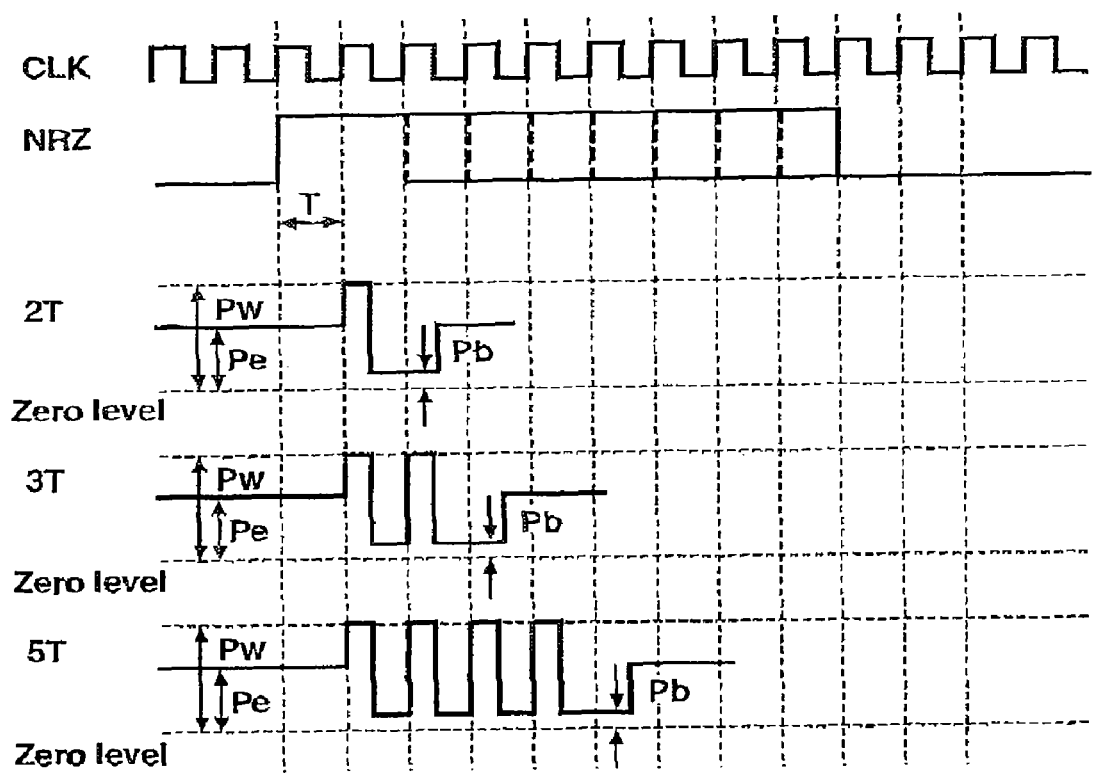
FIG. 2 is a timing chart in which a multi-pulse-type recording waveform is applied to the optical disk.

FIG. 2 illustrates one example of a recorded waveform in which a laser beam pulse being of a multi-pulse type is provided for the rewritable BD-R. Reference character CLK denotes a recording frequency as a reference and reference character NRZ signifies the length of data row to be recorded. For example, a recording mark under 2T, which is twice as long as a recording mark under the recording frequency T is formed.

As a laser power with which the recording film is irradiated, there are available a recording power Pw for providing the recording film with a thermal change for recording, an erasing power Pe for returning the recording film to an amorphous state being a non-recorded state by a gradual thermal change and a bottom power Pb for cutting off heat.

Changing over the recording power Pw and bottom power Pb alternately at the period of a recording frequency inhibits heat from being accumulated in the recording medium.

Figure 3:
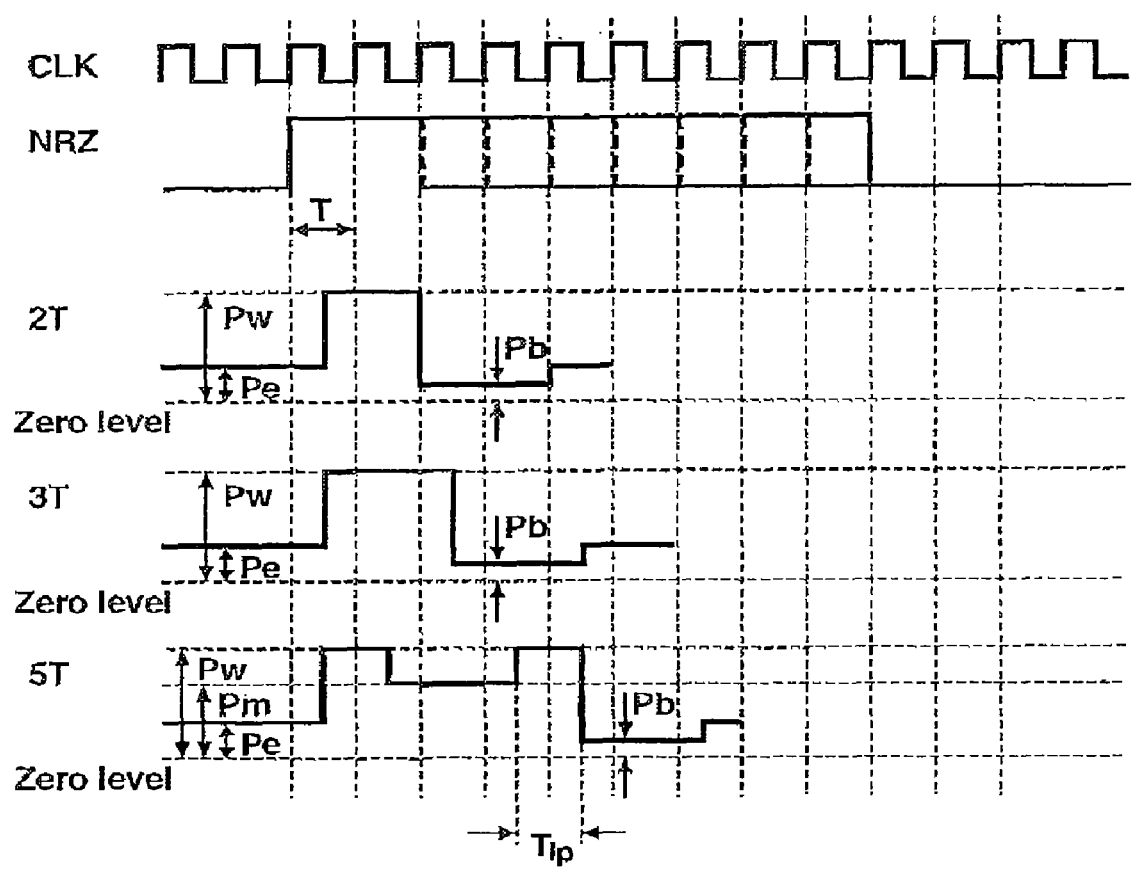
FIG. 3 is a timing chart in which a castle-type recording waveform is applied to the optical disk.

FIG. 3 illustrated a recording waveform for the BD-R in which a laser power being of a castle system is provided for a long mark of 4T or more instead of a multi-pulse system in FIG. 2.

Since the multi-pulse system is extremely low in pulse width to make the recording power unstable at the time of a high speed recording on the optical disk, the castle system is used. The castle-type pulse is formed of a combination of a leading pulse, a middle pulse and a last pulse and referred to as "castle-type pulse" because of uniqueness of the entire shape.

Reference character Pm denotes a middle power between Pw and Pb, reference character Pw is the recording power of the leading pulse and the last pulse and therefore the middle power Pm is slightly lower than the recording power Pw. The ratio of Pm to Pw is approximately 60% to 80%, depending on kinds of recording media.

A space power Ps corresponds to an auxiliary power for forming a recording mark. The information recording and reproducing apparatus provides remaining heat for the optical disk by the space power Ps to improve the reaction of the optical disk to the recording power Pw.

In the optical disk, the length of a mark and a space represents information. The BD uses 2T to 8T for both of the mark and the space length and 9T for Sync for synchronization.

An optical pickup 106 illustrated in FIG. 1 is commonly provided in the reproduction signal processing unit 101 and in the recording signal processing unit 102. The optical pickup includes a semiconductor laser (LD) 107, a condenser lens 108, a beam splitter 109 and a photodetector 110.

The reproduction signal processing unit 101 includes the optical pickup 106, a waveform equalization circuit 111, a binarization circuit 112, a phase lock loop (PLL) 113 and a demodulation circuit 114.

A signal read by the optical pickup 106 from the information recording medium 103 reaches the photodetector 110 through the condenser lens 108 and the beam splitter 109 and the photodetector 110 converts an optical signal to an electrical signal and outputs the electrical signal.

The electrical signal is inputted to the waveform equalization circuit 111. The waveform equalization circuit 111 effectively acquires signal components in which signals in a desired frequency band are emphasized for the purpose of AC coupling, the adjustment of level of signal amplitude and noise reduction. The binarization circuit 112 binarizes the signal level outputted from the waveform equalization circuit 111 based on a slice level. The binarized signal is subjected to a timing correction in synchronization with a reproduction clock in the PLL 113.

A microcomputer 115 controls the information recording and reproducing apparatus reading information from and writing information on the recording medium. The microcomputer 115 controls each block of the recording and reproducing apparatus.

The recording signal processing unit 102 includes a recording data generating circuit 116, a phase compensation circuit 117, a pulse generating circuit 118, a laser power controlling circuit 119, a laser driving circuit 120 and the optical pickup 106. The recording data generating circuit 116 modulates a data row for recording information in the recording medium according to the modulation system of the recording and reproducing apparatus.

The recording data generating circuit 116 generates recording data to be recorded in the optical disk on the basis of the data sent from the microcomputer 115. The phase compensation circuit 117 detects the phase of the reproduced signal to compare it with the length of multiplication of data length of the reference clock (T) and feeds back the deviation of the comparative result from the reproduction result to the pulse generating circuit 118.

The pulse generating circuit 118 generates a recording pulse waveform according to the information recording medium on the basis of the recording data from the recording data generating circuit 116 and the compensation value from the phase compensation circuit 117. An optimum recording pulse code as control information is recorded on the optical disk. The pulse generating circuit may generate the recording pulse from the code recorded on the recording medium, or may generate the recording pulse form its own data.

The laser power controlling circuit 119 sets and controls the laser power according to each level of the recording pulses generated by the pulse generating circuit 118. As is the case with the pulse waveform, the laser power may also be generated from the code recorded on the information recording medium or may be generated from fixed data possessed in advance by the recording and reproducing apparatus.

The laser driving circuit 120 drives the semiconductor laser 107 based on the laser pulse width and the laser power set by the pulse generating circuit 118 and the laser power controlling circuit.

The recording signal processing unit 102 accesses a recording area where information is recorded under a predetermined condition and the reproduction signal processing unit 101 acquires the reproduction signal reproduced from the area and feeds back the phase shift of each recording mark and space to the recording signal processing unit 102 to derive an appropriate recording conditions.

Figure 4:
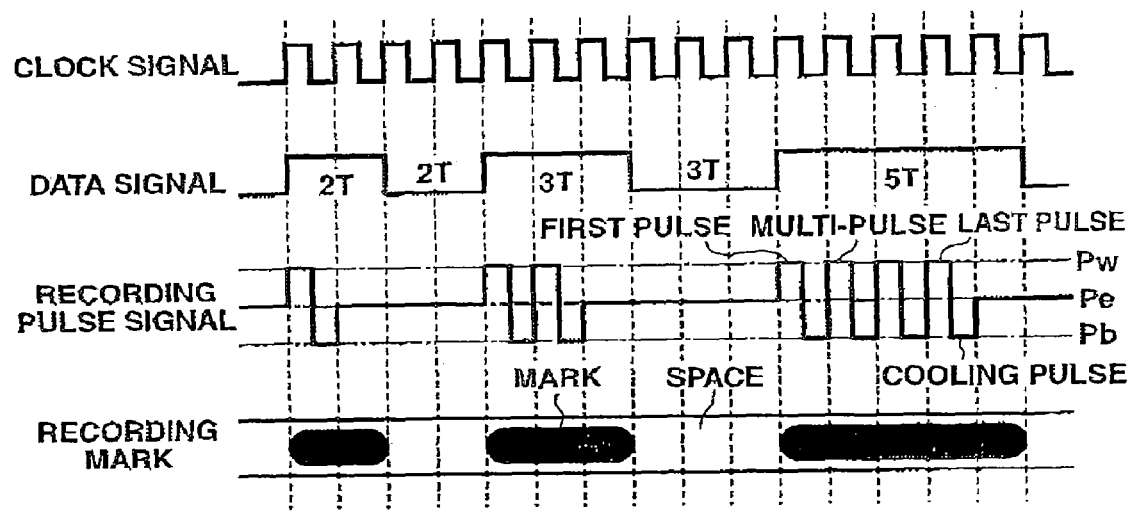
FIG. 4 is a timing chart illustrating a relationship between a data signal, a recording pulse signal and a recording mark at the time of recording data on the optical disk.

FIG. 4 is a timing chart illustrating a relationship related to the position and timing of a recording data signal, recording pulse signal and the recording mark. A clock signal as a reference is shown in the topmost portion.

The recording data generating circuit 116 illustrated in FIG. 1 generates a data signal from the information signal of the microcomputer 115 with the clock signal as a reference. The pulse generating circuit 118 generates a recording pulse waveform according to each data signal. The pulse generating circuit 118 classifies pulses into four groups in each recording mark: first pulse; multi-pulse; last pulse; and cooling pulse.

The first pulse is arranged at the leading portion of the recording mark and the laser power controlling circuit 119 allocates the recording power Pw to the first pulse. The first pulse determines the position of the leading edge of the recording mark to be recorded on the optical disk.

The laser power controlling circuit 119 allocates the recording power Pw and the bottom power Pb to the multi-pulse at a period of a clock frequency. The multi-pulse acts to effectively cut off heat to stably form the recording mark determined by the first pulse.

Furthermore, the laser power controlling circuit 119 allocates the last pulse to the final stage of the recording mark. The last pulse acts to determine the position of the terminal edge of the recording mark. The recording power Pw is allocated to the first pulse, multi-pulse and last pulse. The cooling pulse (bottom power Pb) is allocated to the end of the recording pulse. Thermal energy depending on the last pulse is cut off by the cooling pulse to accurately form the terminal portion of the recording mark.

A short mark does not require the multi-pulse. The multi-pulse is not used for the 3T mark. The last pulse is not used for the 2T mark. The number of multi-pulses is adjusted according to the recording mark length. The 4T mark has one multi-pulse. The number of multi-pulses is increased by one in proportion as the mark length is increased by 1T. The laser power controlling circuit 119 and the laser driving circuit 120 irradiate the information recording medium with a controlled laser power to form the recording marks illustrated in the bottom portion of FIG. 4 in the optical disk.

Figure 5:
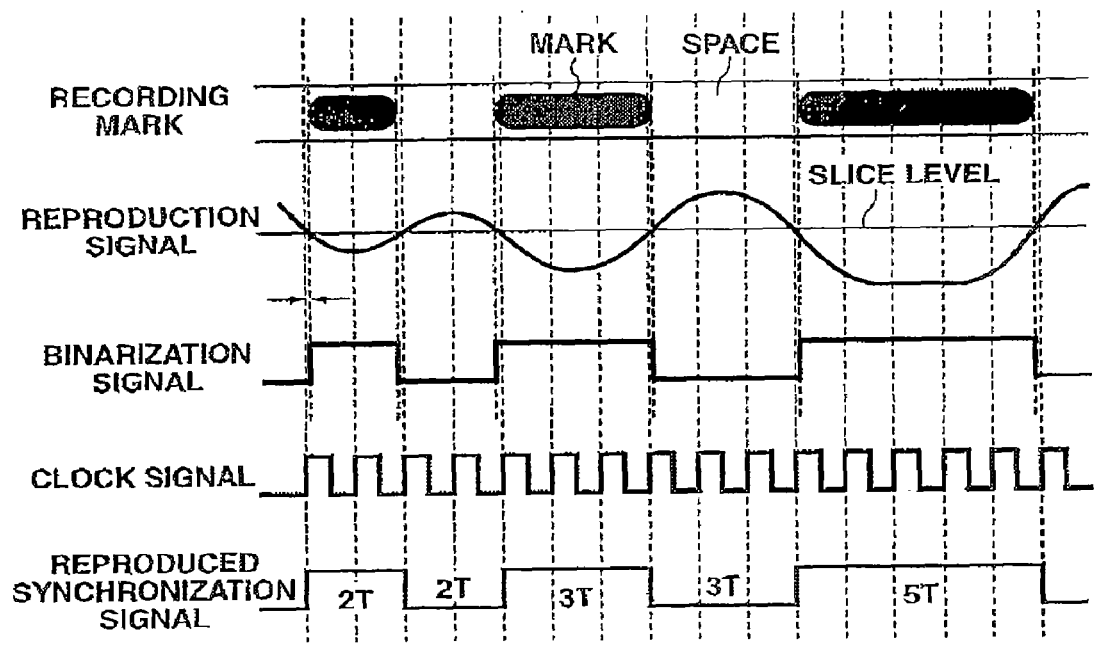
FIG. 5 is a timing chart illustrating a relationship between a reproducing signal, a binarizing signal, a clock signal and a reproducing synchronous signal at the time of reproducing data on the optical disk.

FIG. 5 is a timing chart at the time of reproducing data from the recording mark. FIG. 5 illustrates recording marks on the information recording medium, a reproduced signal in which the reproduced signal obtained from the recording mark is waveform-equalized by the waveform equalization circuit 111, a binarized signal in the binarization circuit 112, a clock signal as a reference and a reproduction synchronization signal synchronized with the clock signal.

The binarized signal is generated at the binarization circuit 112 such that the reproduced signal is sliced with a slice level. The PLL 113 generates the reference clock signal from the binarized signal. The reproduction synchronization signal is one in which the binarized signal is synchronized with the clock signal in the demodulation circuit 114 and is a data row conforming to the modulation system specified according to the system of the information recording medium.

Mark shift information on the recording pulse, which is an evaluation index for optimizing the recording conditions, is determined from the relationship of a phase difference between the binarized signal and the reproduction synchronization signal. The mark shift information is evaluated as a relative positional shift of the recording mark on the information recording medium and the displacement of the recording mark length with respect to the reference length.

The standard deviation of the displacement is a jitter. A parameter is adjusted at the time of optimizing the recording conditions so as to reduce the jitter obtained from the reproduced signal as much as possible. The parameter is adjusted by adjusting the recording power of the recording pulse and the shift of the recording pulse.

Figure 6:
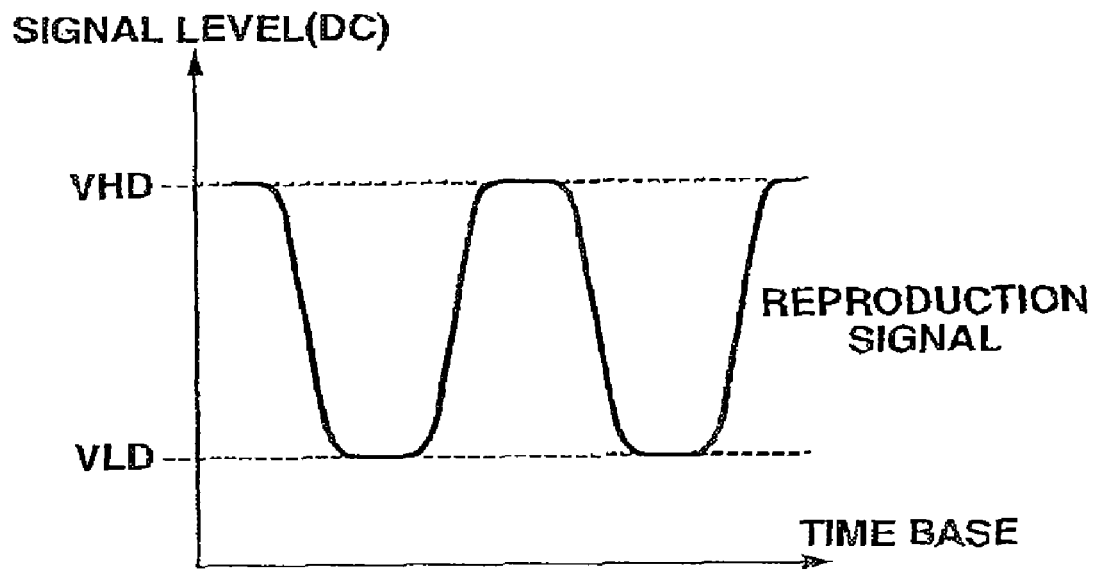
FIG. 6 is a chart illustrating the level of a signal in which a reproduced signal is obtained by DC.

As an index for evaluating the signal level of the reproduced signal, there is available a modulation MOD and a beta ($\beta$). The optimization of the signal level optimizes the recording power of the recording pulse. FIG. 6 shows a result in which a reproduced signal is acquired by DC. If the upper level of the reproduced signal level is taken as VHD and the lower level thereof is taken as VLD, the modulation degree MOD is represented by the following equation:

$$MOD = (VHD - VLD)/VHD.$$

The modulation degree MOD is a parameter correlated with the recording power depending on the characteristics of the recording film of the optical disk.

Figure 7:
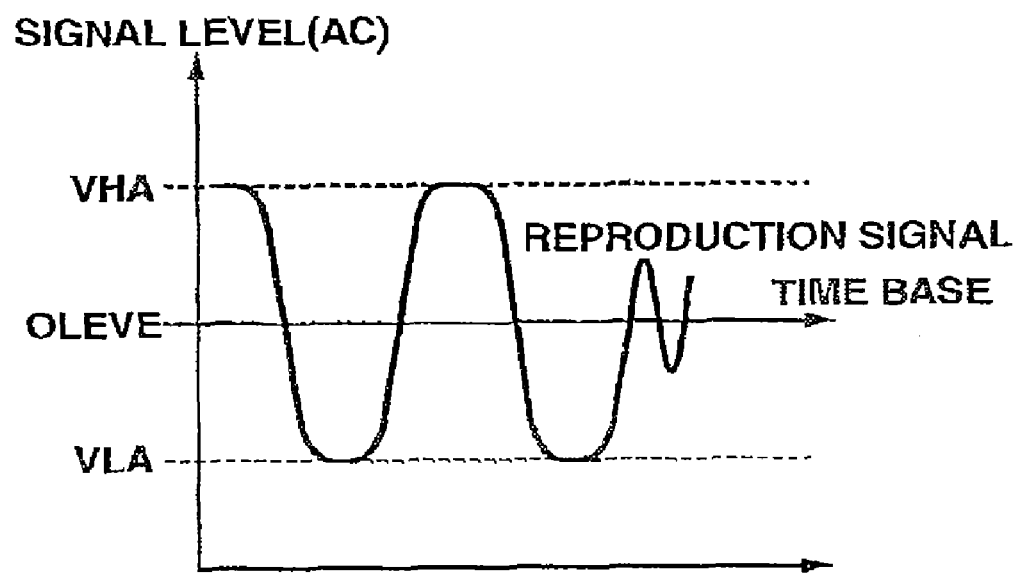
FIG. 7 is a chart illustrating the level of a signal in which a reproduced signal is obtained by AC.

FIG. 7 shows a result in which a reproduced signal is acquired by AC. As is the case with FIG. 6, if the upper level of the reproduced signal level is taken as VHA and the lower level thereof is taken as VLA, the reproduced signal is obtained by AC, so that the lower level VLA becomes a minus value. At this point, beta ($\beta$) is calculated by the following equation:

$$\beta = (VHA + VLA)/(VHA - VLA).$$

Beta ($\beta$) is a parameter correlated with the recording power as is the case with the modulation degree MOD.

Figure 8:
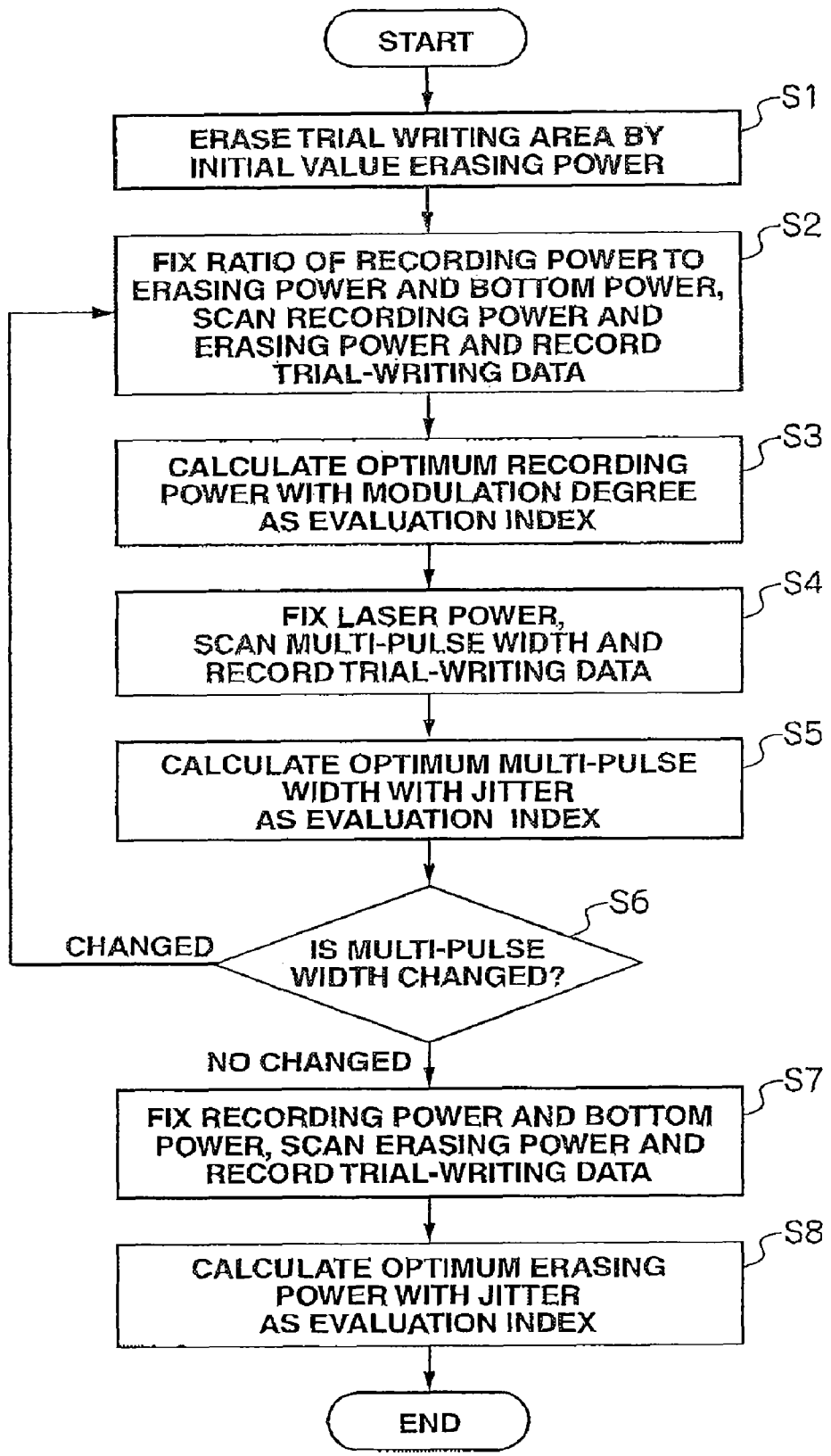
FIG. 8 is a flow chart illustrating the operation at the time of applying a multi-pulse type recording waveform to the BD-R being a rewritable optical disk.

The operation for optimizing the recording signal is described using a flow chart. FIG. 8 is a flow chart illustrating the operation at the time of applying a multi-pulse-type recording waveform to the BD-R being a rewritable optical disk.

The recording signal processing unit 102 writes data on trial at the area of the inner periphery of the disk being a low speed recording area. Prior to the trial writing, the recording signal processing unit 102 provides an initial power as a laser optical pulse to the trial writing area of the optical disk to erase the recording mark (S1).

The recording signal processing unit 102 scans the recording power to obtain the recording power. For that purpose, the recording signal processing unit 102 fixes the ratio of the recording power to the erasing power and bottom power, scans the recording power and the erasing power and records the trial writing data on the optical disk (S2).

A data pattern used for the trial writing may be selected at random or a pattern long in the recording mark length may be selected. The amplitude and the step width of a power to be scanned may be based on the value written as the disk information of the optical disk or on the value stored in the memory of the recording and reproducing apparatus.

For example, if the recording power Pw on which the recording disk is based is 5.0 mW, the ratio of the erasing power Pe to the recording power Pw is 0.60 and the bottom power Pb is 0.3 mW, for example, varying the recording power stepwise in increments of 0.2 mW in the range from 2.0 mW to 4.0 mW prevents the disk from being deteriorated. In this case, since the Pe/Pw is fixed, the erasing power Pe is varied in the range from 1.2 mW to 2.4 mW according to the variation of the recording power.

If the recording power is scanned outside the range of the referential recording power, an optimum recording power needs analogizing. For that purpose, the recording and reproducing apparatus calculates an optimum recording power with a modulation degree as an evaluation index (S3).

Figure 9:
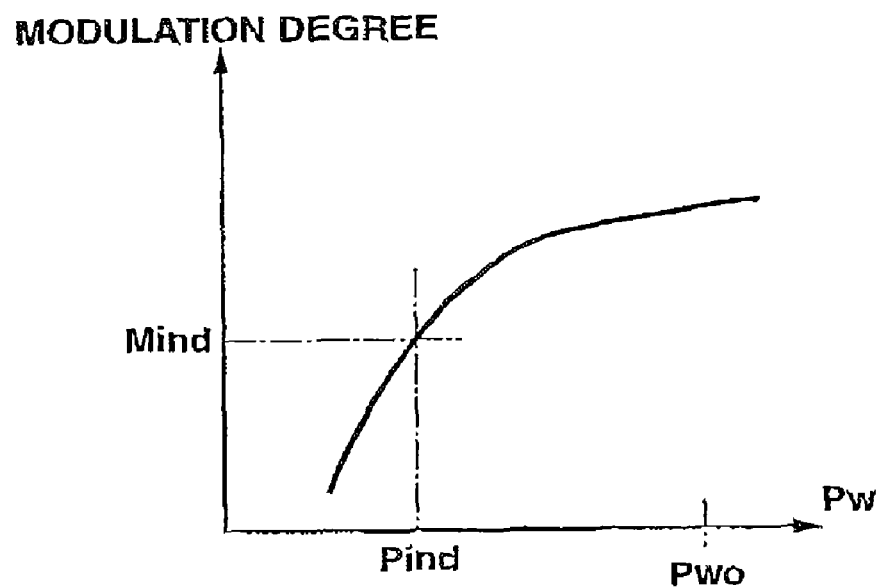
FIG. 9 is a chart illustrating a relationship between a recording power and a modulation degree.

The calculating method is described below with reference to FIG. 9. In FIG. 9, a horizontal axis shows the recording power Pw and an vertical axis shows the modulation degree MOD. A recording power Pind as an index is determined with respect to the optimum recording power Pwo. The recording power Pind may be determined based on the data stored in the disk or the data stored in the memory of the recording and reproducing apparatus. The same holds true for "Mind."

If the recording power as the reference value of the modulation degree Mind is taken as Pind, the optimum recording power Pwo is calculated from the following equation:

$$Pwo = Pind \times K,$$

where, K is a constant. If the optimum recording power is included in the scanning range, the recording signal processing unit 102 varies the recording power stepwise, for example, in increments of 0.2 mW in the range from 4.0 mW to 6.0 mW to form the recording mark on the optical disk. In this case, the jitter as well as the modulation degree may be used as an evaluation index.

Figure 10:
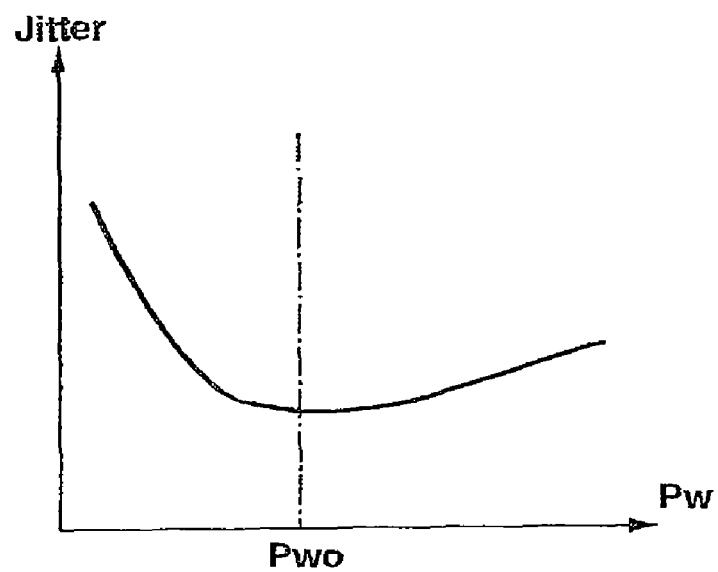
FIG. 10 is a chart illustrating a relationship between a recording power and a jitter.

FIG. 10 is a chart illustrating the relationship between the jitter and the recording power. If the recording and reproducing apparatus can search a recording power in the around of the optimum recording power Pwo, the recording power does not need analogizing and the recording performances of recorded reproduction signal can be confirmed, so that the recording power can be accurately obtained. If the recording and reproducing apparatus adjusts a recording power only at the optimum recording power Pwo or less, the recording performance cannot be confirmed, so that the jitter cannot be used as a direct index.

The recording and reproducing apparatus performs verification because the modulation degree depends on a state where a long recording-mark-length is formed. The recording and reproducing apparatus fixes a recording power, erasing power and bottom power to the values calculated at step S3.

The recording and reproducing apparatus varies the width of multi-pulse and records data in the trial writing area of the low speed recording area (S4). As is the case with the recording power, information of parameters such as pulse width and pulse position for adjusting the shift of the recording pulse may use information of the disk or the value possessed in advance by the recording and reproducing apparatus.

Although the step width of the multi-pulse depends on the laser driver used in the recording and reproducing apparatus, the recording and reproducing apparatus can control the step width of the multi-pulse, for example, in an accuracy which is 32 times as accurate as that of the reference clock. For example, the multi-pulse width used as an initial value is taken as 12/32×T. Where, T is a reference clock, and T=7.57 ns at a double speed in BD.

In this case, the recording and reproducing apparatus varies the step width of the multi-pulse stepwise, for example, in the range from 8/32×T to 16/32×T. As a result, the minimum value as an index is calculated as the optimum multi-pulse width (S5).

Figure 11:
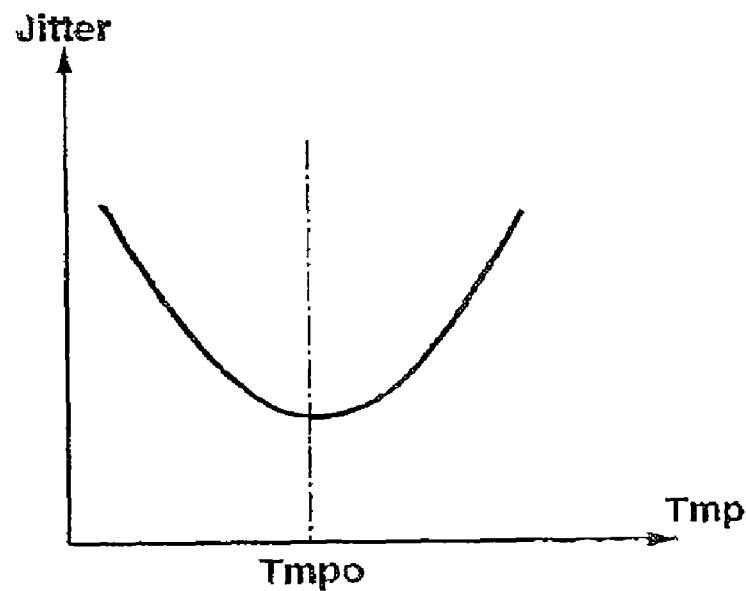
FIG. 11 is a chart illustrating a relationship between the width of a multi-pulse and a jitter.

FIG. 11 is a chart illustrating the relationship between the jitter and the multi-pulse width. Reference character "Tmpo" at which the jitter is minimized is the optimum value of the multi-pulse width. Varying the multi-pulse width varies the shortest mark length and the balance between the long mark length and the space using the multi-pulse. For this reason, a slice level for binarization process is varied, failing to obtain a convergence point.

If a difference is generated between the multi-pulse width used at steps S2 and S5, the calculated value of the optimum recording power might be changed by the multi-pulse width, so that the recording and reproducing apparatus returns to step S2 to calculate again the optimum recording power (S6). If the recording and reproducing apparatus determines that there is no difference between evaluation results of the multi-pulse widths, the process proceeds to the following step.

At step S5, if the multi-pulse width is accurately determined, the recording and reproducing apparatus scans the erasing power to write data on trial (S7). Since the recording and reproducing apparatus also evaluates the performance of the erasing power, the apparatus can scan the erasing power again at the area where the trial writing has been performed at step S7. Data is recorded by the recording power in the same area, the recording mark is erased by the erasing power and then recorded by the same recording power, thereby enabling evaluating recording characteristics with importance attached on rewriting characteristics.

At step S7, since the recording power has already been determined, the recording and reproducing apparatus determines the range of the erasing power with the previously obtained recording power as a reference. For example, if the erasing power determined at step S3 is 4.0 mW the erasing power may be varied stepwise in increments of 0.2 mW in the range from 3.0 mW to 5.0 mW, for example.

Figure 12:
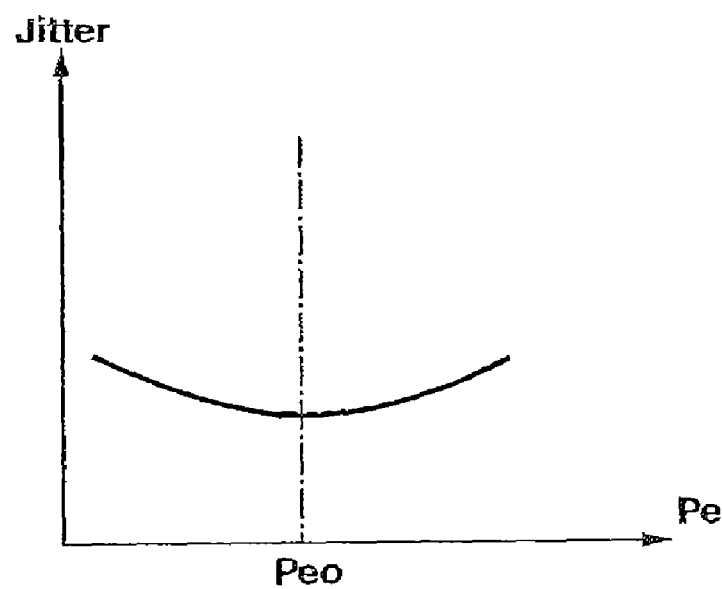
FIG. 12 is a chart illustrating a relationship between an erasing power and a jitter.

FIG. 12 is a chart illustrating the relationship between the jitter and the erasing power. Reference character "Peo" at which the jitter is minimized is the optimum value of the erasing power. At step S8, the area in which the erasing power is varied stepwise and recorded is reproduced and the optimum value of the erasing power is calculated with the jitter as an evaluating index.

The recording and reproducing apparatus executes the flow chart in FIG. 6 to enable optimizing the recording and the erasing power of the recording pulse at the time of recording information on the optical disk at a low speed and optimizing the shift adjustment of the recording pulse.

However, as described above, there is a problem in that, when the recording and reproducing apparatus records information on the optical disk at a high speed, the jitter being the displacement of the recording pulse on the time base cannot be stably detected, so that the pulse width of the recording pulse and the shift adjustment of the pulse position cannot be optimized.

Therefore, the recording and reproducing apparatus writes information on trial on the outer periphery being a high speed recording area of the optical disk according to the steps S1 to S3 of the flow chart in FIG. 8, determines the optimum recording power and extrapolates the shift conditions of the recording pulse obtained as a result of a low-speed trial writing into the shift conditions of the recording pulse at a high speed recording.

The shift adjustment value (A) of the recording pulse at the high speed recording can be obtained by multiplying the optimum value (B) related to the shift adjustment of the recording pulse at a low speed recording by a correction factor (C).

$$A = C \times B$$

The recording and reproducing apparatus may record information on the optical disk at a high speed according to the shift condition of the recording pulse obtained by this conversion equation and the optimum recording power obtained by the trial writing.

Figure 13:
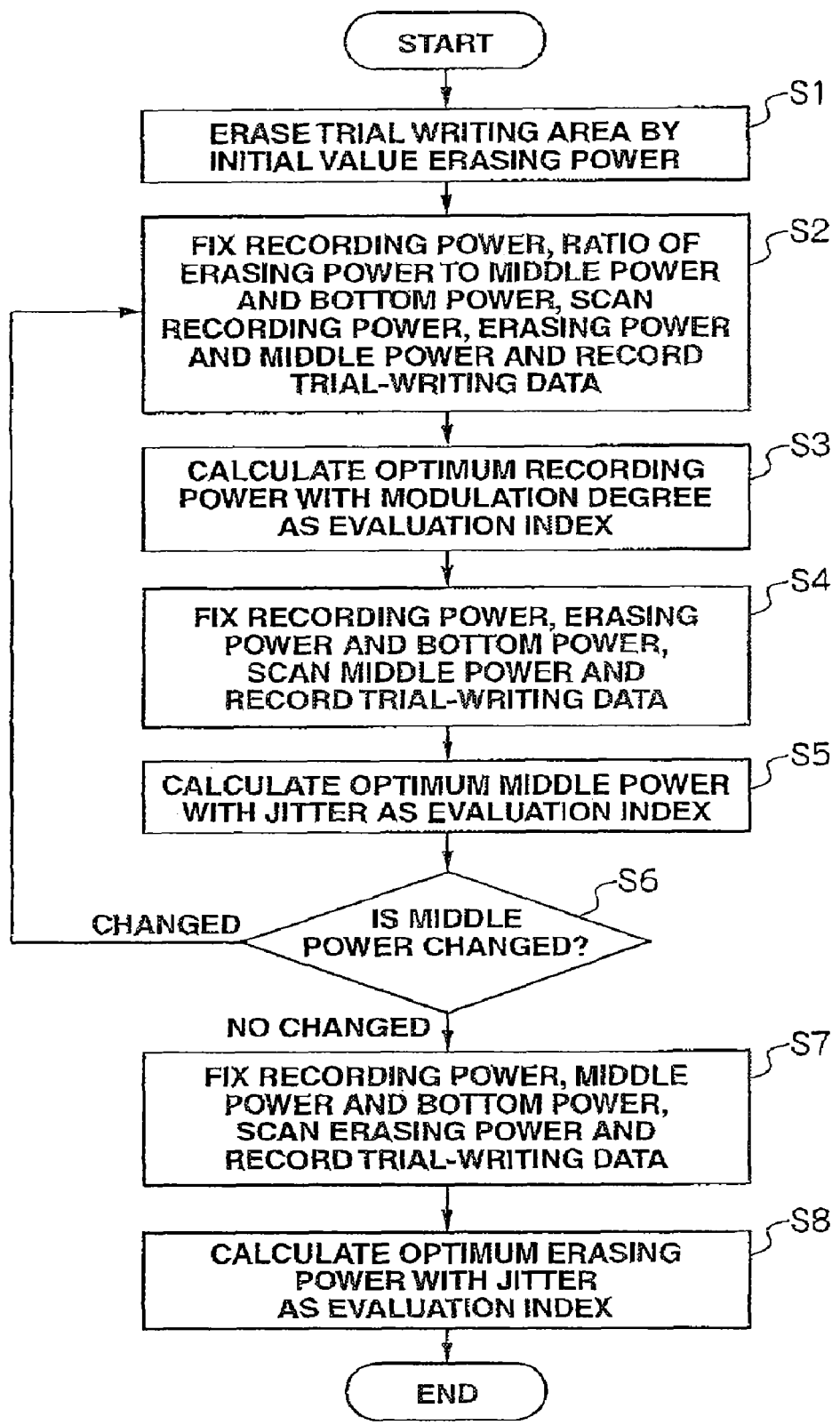
FIG. 13 is a flow chart for applying the castle-type recording waveform to the BD-R to optimize the recording conditions.

The detailed contents of a correction factor are described below. FIG. 13 is a flow chart for applying a castle-type recording waveform to the BD-R to optimize the recording conditions. The same portions as those in the flow chart of FIG. 8 are given the same reference characters to omit the description thereof.

The step S1 is the same as that in the description of FIG. 8. In the castle-type recording waveform, the relationship between the recording power and the middle power becomes an important parameter in terms of forming the recording mark on the optical disk.

For that purpose, the recording and reproducing apparatus fixes the recording power, the erasing power and the ratio of the middle power to the recording power (Pm/Pw) at S2. The bottom power may be a level at which a stable output is obtained and the laser power does not completely disappear.

The recording and reproducing apparatus scans the recording power, erasing power and middle power. The process for calculating the optimum recording power at step S3 is the same as that in FIG. 8. At step S4 in FIG. 8, verification is performed on a state where a long recording mark is formed with the multi-pulse width as a parameter. In the castle-type recording pulse, the same method is applied as the ratio Pm/Pw of the middle power Pm to the recording power Pw.

The recording power, erasing power and middle power are taken to be fixed values according to the result obtained at step S3. The recording and reproducing apparatus varies the middle power Pm and records steps of each variation on the optical disk in order (S4).

Suppose that the recording power of the castle-type pulse used as an initial value is 8 mW and the middle power is 6.5 mW. At this point, the recording and reproducing apparatus varies the middle power Pm stepwise in increments of 0.2 mW in the range from 5.5 mW to 7.5 mW. As a result, the recording and reproducing apparatus calculates a value in which the jitter as an index is minimized as an optimum middle power (S5).

Figure 14:
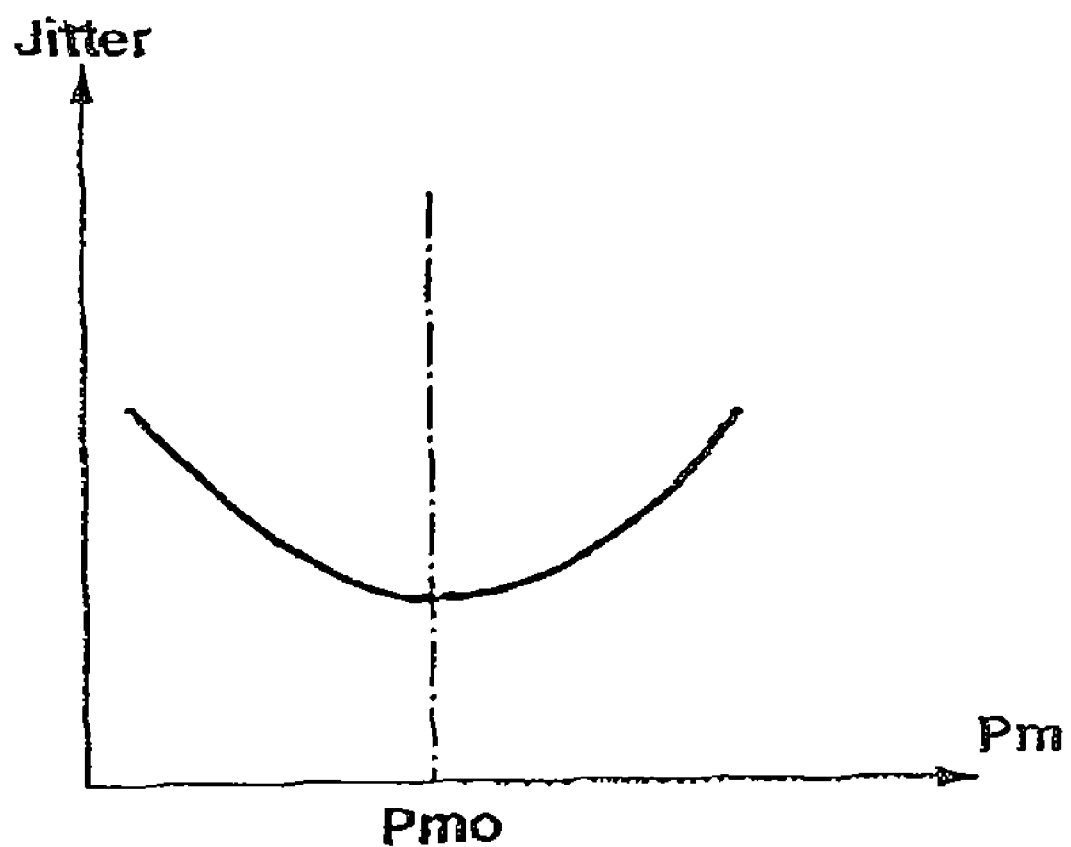
FIG. 14 is a chart illustrating a relationship between a middle power and a jitter.

FIG. 14 is a chart illustrating the relationship between the jitter and the middle power Pm. Reference character "Pmo" at which the jitter is minimized is the optimum value of the middle power. Varying the middle power Pm varies the mark/space balance between the shortest mark length and the long mark length using the middle power Pm. This varies a slice level used for a binarizing process, failing to obtain a convergence point.

As a result, if a difference is generated in the result (S5) of calculating the optimum value of the middle power Pm as a parameter between the middle powers used at steps S2 and S5, the calculated value of the optimum recording power might be changed by the middle power Pm, so that the recording and reproducing apparatus returns to step S2 to calculate again the optimum recording power. If the recording and reproducing apparatus determines that there is no difference between evaluation results of the middle power, the process proceeds to the following step. At step S7, as is the case with step S2, the erasing power is scanned with the middle power taken into consideration as one of parameters of the recording power.

The recording and reproducing apparatus executes the flow chart in FIG. 13 to obtain the optimum value Pw of the recording power and the ratio of Pm to Pw related to the optimum middle power Pm in a low speed recording.

Although not illustrated in FIG. 13, the recording and reproducing apparatus may use the width of the short mark (2T), the relative position of the short mark to the long mark (4T or more) and the width of the last pulse of the long mark (Tlp in FIG. 3) as an index for evaluating the jitter, instead of the ratio of Pm to Pw. The recording and reproducing apparatus stores the optimum value of the evaluation index of the recording pulse in the memory.

The recording and reproducing apparatus obtains the optimum recording power of the recording pulse at the high speed recording according to the flow chart of FIG. 13 and stores the optimum recording power in the memory. The recording and reproducing apparatus determines the shift conditions of the recording power at the high speed recording from the shift conditions of the recording power obtained by the trial writing at a low speed writing.

Since the entrance of thermal energy into the recording medium at the time of forming the long mark (4T or more) on the recording medium predominates over the entrance of thermal energy into the recording medium at the time of forming the short mark (2T) on the recording medium at the high speed recording, the recording and reproducing apparatus relatively decreases the amount of thermal energy applied to the long mark at the high speed recording or relatively increases the amount of thermal energy applied to the short mark to vary the width of the short and the long mark and the relative position of the short and the long mark, optimizing the shift conditions of the recording power at the high speed recording.

The first example of the aforementioned extrapolation varies only the ratio of Pm to Pw obtained at the low speed recording. The recording and reproducing apparatus lowers the ratio of Pm to Pw obtained at the low speed recording at a constant ratio, for example, in the range from 90% or more to 95% or less to decrease the thermal energy to the long mark at the time of applying the laser beam to the recording medium.

The ratio of Pm to Pw at the low speed recording depends on the characteristics of the disk and lies between 60% and 80%. Approximately 90% of the ratio of Pm to Pw at the low speed recording is taken as the ratio of Pm to Pw at the high speed recording to enable the jitter adjusted to a minimum at the low speed recording to be maintained also at the high speed recording.

Figure 15:
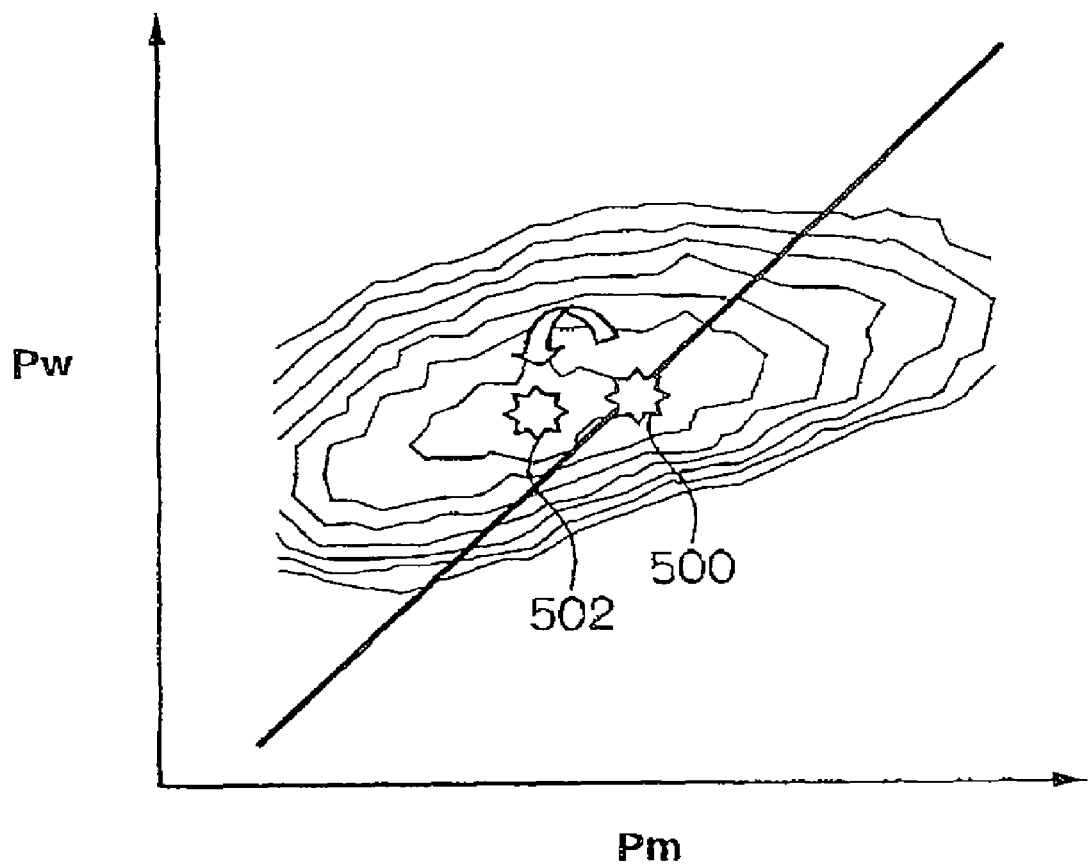
FIG. 15 is a chart illustrating measurement results of the amount of a jitter obtained with the correction factor changed with respect to the shift conditions of the recording pulse obtained at the quadruple-speed (4×) recording and reproducing of BD-R.

FIG. 15 is a chart illustrating measurement results of the amount of the jitter obtained with the correction factor changed with respect to the shift conditions of the recording pulse obtained at the quadruple-speed (4×) recording and reproducing. A contour line shows the range same in the jitter and shows that the amount of the jitter becomes smaller in proportion as it gets closer to the center. A center point 500 shows the optimum recording power obtained at the sextuple-speed (6×) recording and reproducing. The oblique line indicates a power scanning line at the time of obtaining the optimum recording power and shows that the ratio of Pm to Pw is fixed.

Reference numeral 502 denotes the optimum recording condition that the amount of the jitter is a minimum. The examination of the ratio of Pm to Pw at the optimum recording condition found that it was 90% of the ratio of Pm to Pw at the quadruple-speed (4×) recording and reproducing.

The second example of the aforementioned extrapolation varies only the width (Tlp) of the last pulse of the castle-type recording pulse. For example, 90% to 95% of Tlp at the low speed recording are taken as Tlp at the high speed recording.

The third example of the aforementioned extrapolation increases the width of the short mark 2T to 105% to 110% greater than that at the low speed recording in order to relatively increase the thermal energy at the time of forming the short mark with respect to the thermal energy at the time of forming the long mark.

The foregoing correction factor is varied depending on the tolerance of the drive, temperature and the tolerance of the disk, so that the foregoing correction factor may be changed at discretion and determined. A table of correction factors for each drive and disk may be stored in a memory 121. The microcomputer refers to the table to obtain the correction factor, enabling obtaining the shift conditions of the recording pulse at the high speed recording from the shift adjustment value obtained at the low speed recording. The correction factor may be a unified value. The microcomputer 115 may obtain a correction value by calculation based on such parameters as the characteristic values of the drive and the disk.

The term "low speed" used in the low speed writing of the present invention refers to a speed at which the shift of the recording pulse can be adjusted from the recording mark written on trial. The term "high speed" used in the high speed writing refers to a speed at which the recording and reproducing apparatus cannot detect the jitter on the time base. For example, the low speed at the low speed recording of the BD drive refers to a speed up to the quadruple-speed (4×) and the high speed at the high speed recording refers to a speed exceeding the double-speed (2×).

When a CAV recording is performed on the optical disk with the inner periphery of the optical disk as the 2.5× low speed recording area and the outer periphery thereof as the 6× high speed recording area, the shift of the recording pulse at the recording area from 2.5× to 4× of the optical disk can be adjusted by interpolation from the shift adjustment values at 2.5× and 4.0×, for example.

The above correction factor is varied at discretion according to the recording speeds in the low and the high speed recording area.

The present invention is also applicable to CD-R, DVD-R, +R and BD-R which are optical disks on which information can be written only once.

Although the first, the second and the third embodiment of the extrapolation are separately described in the above embodiments, at least two of the embodiments may be combined together to determine the above correction factor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of recording information on and reproducing the same from an optical disk comprising:
    a first step of writing data on trial in a first area of an optical disk at a first speed;
    a second step of reproducing the data written on trial on the optical disk;
    a third step of binarizing a reproduced signal obtained from the optical disk;
    a fourth step of synchronizing the binarized signal with a reference clock to obtain a reproduced synchronization signal;
    a fifth step of measuring a phase difference between the reproduced synchronization signal and the reference clock;
    a sixth step of optimizing the shift adjustment of a recording pulse applied to the first area on the basis of the phase difference;
    a seventh step of determining the shift conditions of the recording pulse for recording data in a second area of the optical disk at a second speed different from the first speed on the basis of the optimized shift adjustment value; and
    an eighth step of applying the recording pulse to the second area of the optical disk on the basis of the shift conditions obtained at the seventh step.

2. The method of recording information on and reproducing the same from an optical disk according to claim 1, wherein
    the first area lies at the inner periphery of the optical disk, the second area lies at the outer periphery with respect to the first area and the second speed is faster than the first speed.

3. The method of recording information on and reproducing the same from an optical disk according to claim 2, wherein
    the seventh step extrapolates the optimized shift adjustment value into the shift conditions of the recording pulse to be recorded on the optical disk at a high speed.

4. The method of recording information on and reproducing the same from an optical disk according to claim 3, wherein
    the seventh step multiplies the optimized shift adjustment value by a constant value and takes the product as shift conditions of the recording pulse to be recorded on the optical disk at a high speed.

5. The method of recording information on and reproducing the same from an optical disk according to claim 4, wherein
    the first step applies a castle-type laser beam pulse to the optical disk as the recording pulse for forming a long mark on the optical disk.

6. The method of recording information on and reproducing the same from an optical disk according to claim 5, wherein
    the optimized shift adjustment value at the sixth step is the ratio of the recording power Pw and the middle power Pm of the castle-type laser beam pulse.

7. The method of recording information on and reproducing the same from an optical disk according to claim 5, wherein the optimized shift adjustment value at the sixth step is the pulse width of last pulse of the castle-type laser beam pulse.

8. The method of recording information on and reproducing the same from an optical disk according to claim 5, wherein
the optimized shift adjustment value at the sixth step is the pulse width of the short mark.

9. The method of recording information on and reproducing the same from an optical disk according to any one of claims 6 to 8, wherein
the seventh step multiplies the optimized shift adjustment value by a constant value and takes the product as optimum shift conditions of the recording pulse at a high speed recording.

10. The method of recording information on and reproducing the same from an optical disk according to claim 2, further comprising:
a ninth step of writing data on trial in the second area of the optical disk;
a tenth step of reproducing the data in the second area of the optical disk; and
an eleventh step of determining the optimum recording power of the recording power to be recorded in the second area on the basis of the reproduced signal reproduced at the tenth step; wherein
data is recorded at a high speed in the second area of the optical disk on the basis of the optimum recording power and the optimum shift conditions at the eighth step.

11. An apparatus for recording information on and reproducing the same from an optical disk, comprising:
an optical pickup;
a binarization processing circuit for binarizing a reproduced signal obtained from an optical disk;
a demodulation circuit for synchronizing the binarized signal with a reference clock to obtain a reproduced synchronization signal;
a control circuit for measuring a phase difference between the reproduced synchronization signal and the reference clock and performing the shift adjustment of a recording pulse to be applied to the optical disk on the basis of the phase difference;
a pulse generation circuit for generating the recording pulse to be applied to the optical disk;
a laser power controlling unit for controlling a laser power on the basis of the generated pulse; and
a laser driving circuit; wherein
the control circuit performs control for:
writing the data on trial in a first area of the optical disk at a first speed;
obtaining an optimum shift adjustment value of the recording pulse applied to the first area on the basis of the phase difference;
determining the shift conditions of the recording pulse for recording data in a second area of the optical disk at a second speed different from the first speed on the basis of the shift adjustment value; and
applying the recording pulse in the second area of the optical disk on the basis of the shift conditions.

* * * * *